United States Patent
Post

(10) Patent No.: US 10,412,874 B2
(45) Date of Patent: Sep. 17, 2019

(54) APPARATUS FOR CREATING A FURROW

(71) Applicant: Yellow Jacket Implement, Inc., Riverton, WY (US)

(72) Inventor: Cody Post, Riverton, WY (US)

(73) Assignee: YELLOW JACKET IMPLEMENT, INC, Riverton, WY (US)

( * ) Notice: Subject to any disclaimer, the term of this patent is extended or adjusted under 35 U.S.C. 154(b) by 38 days.

(21) Appl. No.: 15/669,252

(22) Filed: Aug. 4, 2017

(65) Prior Publication Data
US 2019/0037760 A1 Feb. 7, 2019

(51) Int. Cl.
| A01B 35/18 | (2006.01) |
|---|---|
| A01B 49/02 | (2006.01) |
| A01B 61/04 | (2006.01) |
| A01C 5/00 | (2006.01) |
| A01B 13/00 | (2006.01) |
| A01B 29/04 | (2006.01) |
| A01C 5/06 | (2006.01) |

(52) U.S. Cl.
CPC .......... *A01B 49/027* (2013.01); *A01B 13/00* (2013.01); *A01B 29/041* (2013.01); *A01B 35/18* (2013.01); *A01B 61/046* (2013.01); *A01C 5/00* (2013.01); *A01C 5/062* (2013.01); *A01C 5/068* (2013.01)

(58) Field of Classification Search
CPC .. A01B 5/00; A01B 5/04; A01B 35/18; A01B 13/00
USPC ....... 172/134, 149, 150, 156, 157, 174, 175, 172/176, 184
See application file for complete search history.

(56) References Cited

U.S. PATENT DOCUMENTS

| 245,258 | A | * | 8/1881 | Clarkson | A01B 69/024 |
|---|---|---|---|---|---|
| | | | | | 111/33 |
| 1,238,497 | A | * | 8/1917 | Connelly | E01C 19/29 |
| | | | | | 172/150 |
| 1,497,779 | A | | 6/1924 | Garst | |
| 1,868,974 | A | * | 7/1932 | Geraldson | A01C 7/20 |
| | | | | | 111/144 |
| 2,562,486 | A | | 7/1951 | Denning | |
| 2,767,633 | A | * | 10/1956 | Franz | A01B 13/00 |
| | | | | | 172/143 |
| 2,837,989 | A | | 6/1958 | Gann | |
| 3,128,833 | A | | 4/1964 | Johnson | |
| 3,252,522 | A | | 5/1966 | Taylor | |
| 3,316,865 | A | | 5/1967 | Wiliams | |

(Continued)

FOREIGN PATENT DOCUMENTS

EP    0887002    4/2009

OTHER PUBLICATIONS

"Chapter 7: Choosing an Irrigation Method" FAO Corporate Document Repository. Apr. 18, 2001. Website http://www.fao.org/docrep/S8684E/s8684e08.htm.

(Continued)

Primary Examiner — Gary S Hartmann
(74) Attorney, Agent, or Firm — Voz Patents, LLC

(57) ABSTRACT

Apparatus for creating a ditch or furrow for agricultural use, including an implement pulled by a tractor. Generally, an implement includes a plow, a roller, and a wheel, such as a packer wheel. A plow is located towards an implement front end, and a wheel is located towards an implement back end, typically with the plow coaligned with a wheel. A roller is located on one or both sides of the plow wherein a frame supports the configurations of the plow, roller, and wheel.

14 Claims, 5 Drawing Sheets

(56) References Cited

U.S. PATENT DOCUMENTS

| | | | |
|---|---|---|---|
| 3,437,061 A | 4/1969 | Wells | |
| 3,658,018 A * | 4/1972 | Connor | A01C 5/062 |
| | | | 111/164 |
| 4,002,208 A | 1/1977 | Rougeau | |
| 4,048,929 A | 9/1977 | Zumbahlen | |
| 4,054,007 A | 10/1977 | Moore | |
| 4,055,126 A | 10/1977 | Brown et al. | |
| 4,073,245 A | 2/1978 | Anderson | |
| 4,117,889 A | 10/1978 | Larson | |
| 4,180,005 A | 12/1979 | Zumbahlen | |
| 4,212,254 A | 7/1980 | Zumbahlen | |
| 4,241,674 A | 12/1980 | Mellinger | |
| 4,403,662 A | 9/1983 | Dietrich, Sr. | |
| 4,446,924 A | 5/1984 | Dietrich, Sr. | |
| 4,495,756 A | 1/1985 | Greiner et al. | |
| 4,560,010 A * | 12/1985 | Weichel | A01B 13/08 |
| | | | 172/177 |
| 4,650,005 A | 3/1987 | Tebben | |
| 4,987,841 A | 1/1991 | Rawson | |
| 5,474,135 A | 12/1995 | Schlegel | |
| 5,605,196 A | 2/1997 | Grimm et al. | |
| RE36,243 E | 7/1999 | Rawson et al. | |
| 5,943,798 A | 8/1999 | McGuire et al. | |
| 5,979,567 A | 11/1999 | Green et al. | |
| 5,984,017 A | 11/1999 | Packham | |
| 6,012,534 A * | 1/2000 | Kovach | A01B 13/08 |
| | | | 172/156 |
| 6,119,792 A | 9/2000 | Almer | |
| 6,276,462 B1 | 8/2001 | Dietrich, Sr. | |
| 6,431,287 B1 | 8/2002 | Ramp | |
| 6,578,640 B1 | 6/2003 | Ohlman | |
| 6,681,868 B2 * | 1/2004 | Kovach | A01B 13/08 |
| | | | 172/146 |
| 6,880,644 B2 * | 4/2005 | Weast | A01B 13/08 |
| | | | 172/140 |
| 6,962,039 B2 | 11/2005 | Greenhoe | |
| 7,021,397 B2 * | 4/2006 | Pitonyak | A01B 29/06 |
| | | | 172/311 |
| 7,478,681 B2 | 1/2009 | Alston | |
| 7,478,684 B2 | 1/2009 | Ward | |
| 7,730,961 B2 | 6/2010 | Ward et al. | |
| 8,087,470 B2 | 1/2012 | Kovach et al. | |
| 8,118,110 B2 | 2/2012 | Tamm et al. | |
| 8,356,563 B2 | 1/2013 | Schaffert et al. | |
| 8,596,374 B2 | 12/2013 | Kile | |
| 8,960,321 B2 | 2/2015 | Tamm | |
| 9,192,098 B2 | 11/2015 | Hinton | |
| 9,247,687 B2 | 2/2016 | Gray et al. | |
| 9,271,440 B2 * | 3/2016 | Turko | A01C 7/205 |
| 9,295,894 B2 | 3/2016 | Papadopolous | |
| 9,301,439 B2 | 4/2016 | Gilstring | |
| 9,320,189 B2 | 4/2016 | Nance | |
| 9,615,500 B2 | 4/2017 | Sudbrink | |
| 9,648,799 B2 | 5/2017 | Ohnsat | |
| 2005/0028994 A1 | 2/2005 | Pitonyak et al. | |
| 2006/0151186 A1 * | 7/2006 | Pitonyak | A01B 29/06 |
| | | | 172/311 |
| 2008/0173220 A1 * | 7/2008 | Wuertz | A01B 35/18 |
| | | | 111/22 |
| 2011/0284253 A1 | 11/2011 | Stevenson | |
| 2014/0123885 A1 | 5/2014 | Nance | |
| 2015/0020718 A1 | 1/2015 | Pitonyak | |
| 2015/0107864 A1 | 4/2015 | Carlson | |
| 2015/0271981 A1 | 10/2015 | Degelman | |
| 2015/0321708 A1 | 11/2015 | Van Mill et al. | |

OTHER PUBLICATIONS

"One-Till" Rite Way Mfg. Co. Ltd. Sep. 7, 2015. Website http://ritewaymfg.corn/products/one-till.

"Strip Till" Remlinger Manufacturing. Oct. 18, 2004. Website http://www.remlingermfg.com/strip_till.htm.

"Primary Tillage, Rippers, Chisel Plows, Disks, Mulch Tillers, Reversible Plows" John Deere.

"ExactEmerge and MaxEmerge 5 Row Units" 2015 John Deere Planting Equipment.

"Mounted Packer/Harrow System and Shank Mount Packers" K-Hard Industries. Oct. 1, 1999. http://www.khartindustries.com/packer.html.

"Northside Welding Strip Till" http://www.northsideweldinginc.com/strip-till http://www.northsideweldinginc.com/roller-harrow.

"The One-Till: The ONE Tillage Implement for All Your Tillage Needs" Rite Way Mfg. Co. Ltd.

"Strip Till: The Ultimate in Strip Till Versatility & Performance" Remlinger Manufacturing.

* cited by examiner

APPARATUS FOR CREATING A FURROW

FIELD OF THE INVENTION

Embodiments of the present invention generally relate to a field corrugator for creating an irrigation furrow.

BACKGROUND OF THE INVENTION

Crop irrigation is a vital aspect of agriculture. A furrow or ditch allows water to flow across the surface of a field and supply water to nearby seeds and plants. Furrow irrigation is advantageous for use with certain crops, such as row crops like corn (maize). A challenge in creating furrows in a crop field is producing adequate trenches consistently and quickly.

A notable device used in creating irrigation furrows is a field creaser (also referred to as a Mormon Creaser). Although a field creaser is simple to use, there are a number of disadvantages with its design. A field creaser typically has a plurality of plows secured on a flat horizontal body, which is pulled by a tractor. The flat horizontal body is typically sled-like, having a slope at its front end.

Despite this slope, when in use, a field creaser collects soil towards its front end, which drags the soil towards the end of the field. Another device, such as a tractor, is necessary to clear the excess soil collected towards the edge of a crop field. In cases where seeds have already been broadcasted on the field, these seeds are also dragged towards the edge of the crop field.

Additionally, a field creaser may create imperfect furrows. The characteristic of the soil, and uneven terrain may affect how a field creaser creates a furrow. A field creaser has plows attached to a rigid horizontal body, so it may create shallow or uneven furrows when used on uneven terrain. Furthermore, a field creaser may require pulling at slower speeds in order to effectively create furrows, which leads to wasted time. In some cases, additional manual work is required to "clean up" these imperfect furrows.

There is a need for an implement that creates furrows for irrigation in a consistent manner. There is a need for an implement to be deployed quickly while creating regularly sized furrows, and without requiring additional work. There is a need for an implement to create furrows without dragging soil and possibly seeds across the field.

SUMMARY OF THE INVENTION

Certain embodiments of the invention are related to creating a ditch or furrow for agricultural use. Certain embodiments of the invention include an apparatus, also referred to as an implement. In certain embodiments, a tractor pulls an implement. Generally, an implement includes a plow, a roller, and a wheel. The configuration of the plow, roller, and wheel as described herein solve a number of problems, including creating a furrow quickly and in a consistent manner. It is the object of certain embodiments of the invention to provide a superior device to create furrows in a field. It is also the object of certain embodiments to effectively create furrows while minimizing additional work. It is also the object of certain embodiment to feature replaceable and/or adjustable parts.

In certain embodiments, a plow is located towards an implement front end, and a compacting device, such as wheel or a packer wheel located towards the implement back end. In certain embodiments, a plow is coaligned with a wheel. In certain embodiments, a roller is located on one or both sides of the plow, where the plow is in coalignment with a wheel. In certain embodiments, a frame supports certain configurations of the plow, roller, and wheel.

In certain embodiments of the invention, a plow creates the initial trench in the ground. Plows are configured to attach a replaceable cutting edge, allowing its replacement after wear. As the plow creates a furrow and displaces soil to either side, a roller partially catches the displaced soil while leveling the ground. The wheel compacts the soil and reinforces the furrow. A wheel helps to level the furrow to create an even furrow line. In certain embodiments, a wheel includes a wheel cover that aids to reinforce the sides of the furrow, while protecting the wheel from accumulating soil and debris that may seize the wheel. Certain embodiments include a wheel that is provided with a downward force towards the ground. In certain embodiments, a wheel's downward force and height can be adjusted, such that the implement may be tailored towards various types and sizes of tractors.

Generally, a roller levels the ground as a plow creates a furrow. A roller is rotatable about an axle, allowing the implement to traverse a field while minimizing soil from being dragged across the field. Rollers also allow the implement to be used at a relatively high speed while creating the furrow. In certain embodiments, a roller includes a plurality of segments, allowing customization and replacement of the roller. In certain embodiments, a roller is disposed to move (for example, up and down) relative to the plow. In certain embodiments, motion of the roller allows the roller to conform to the ground as an implement is pulled across uneven terrain. Certain embodiments include a plurality of rollers, where a roller or a set of rollers moves independently of one another. Certain embodiments include flaps to limit soil and debris from dispersing. For example, flaps positioned behind rollers limit soil and debris from entering the furrow.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein

DETAILED DESCRIPTION

Figure 1:
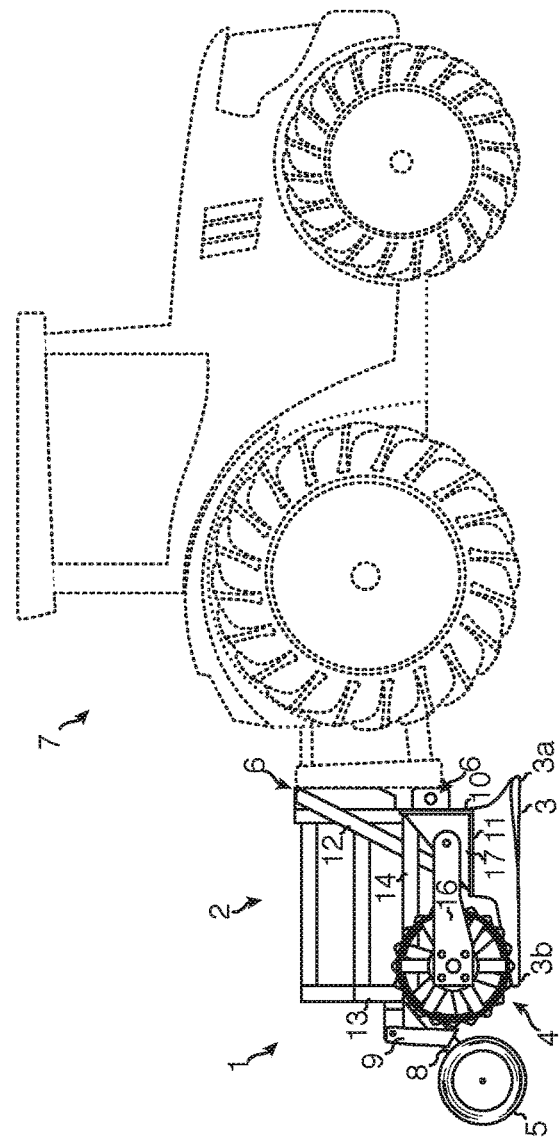
FIG. 1: A side view of certain embodiments of the invention attached to a tractor.
Figure 2:
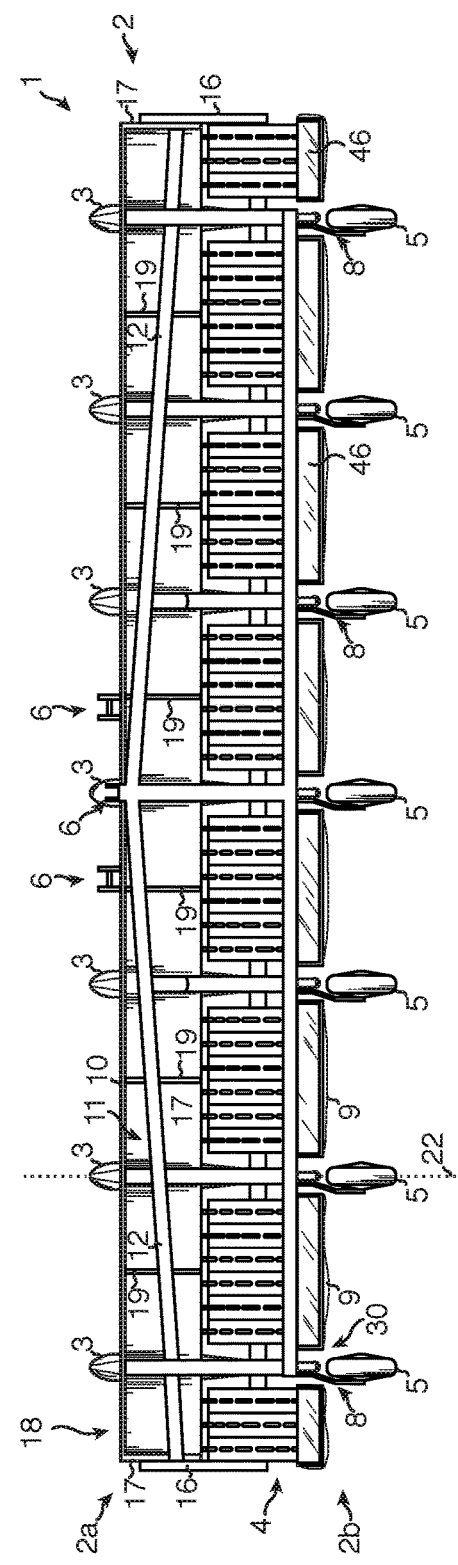
FIG. 2: A top view of certain embodiments of the invention.

It will be appreciated that certain embodiments of the invention include an implement 1. As seen in FIG. 1, in certain embodiments, a tractor 7 pulls an implement 1. Generally, as seen in FIG. 1 and FIG. 2, an implement 1 includes a plow 3, a roller 4, and a wheel 5. In certain embodiments, as seen for example in FIG. 2, a frame 2 supports a plow 3, a roller 4, and a wheel 5.

Referring to FIG. 1 and FIG. 2, in certain embodiments, a plow 3 is located towards the bottom of an implement 1. A plow contacts the ground, and creates a furrow as the implement is advanced across the ground. It can be appreciated that an implement 1 can include a plurality of plows, where the plows are arranged in a parallel orientation.

Figure 3:
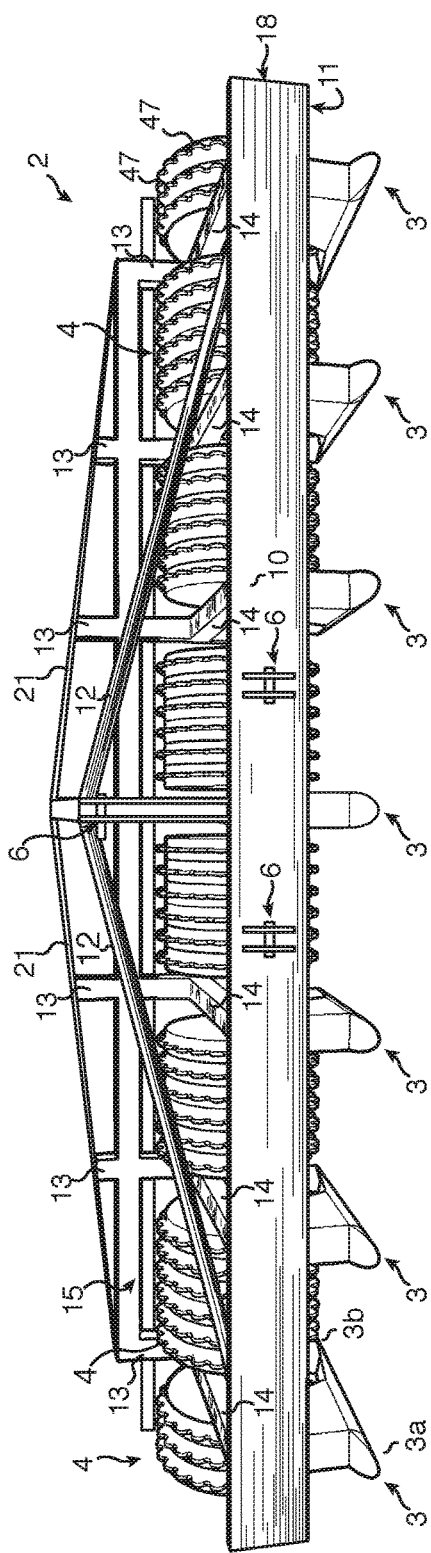
FIG. 3: A front-perspective view of certain embodiments of the invention.
Figure 5:
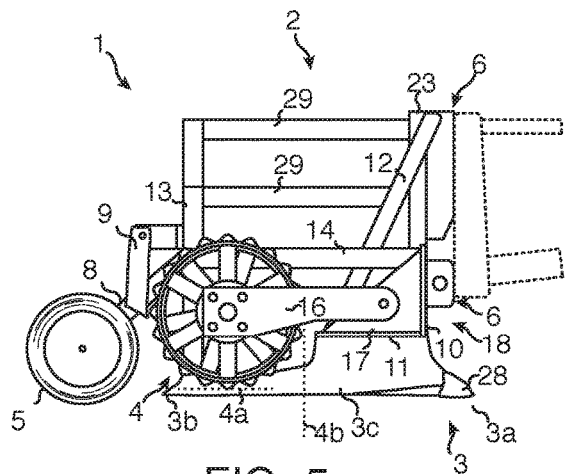
FIG. 5: A side view of certain embodiments of the invention.
Figure 6:
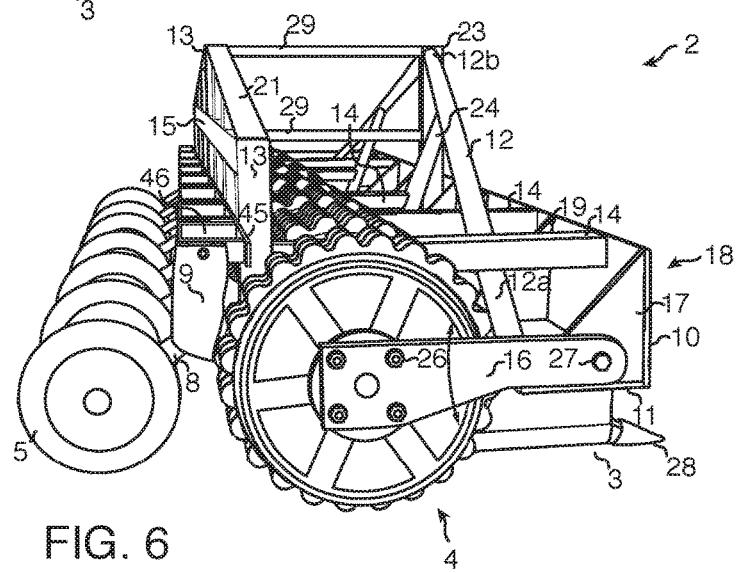
FIG. 6: A side-perspective view of certain embodiments of the invention.

Referring to FIG. 2, in certain embodiments, an implement 1 further includes a mounting structure 18 located towards the frame front end 2a. In certain embodiments, a mounting structure 18 generally attaches to a plow 3. As shown in FIG. 3, FIG. 5, and FIG. 6, a mounting structure 18 has a bottom wall 11 and a front wall 10. In certain embodiments, a plow 3 is attached to the bottom wall 11 of a mounting structure 18. In certain embodiments, referring to FIG. 3 and FIG. 5, a front wall 10 supports at least one mount 6, where the mount 6 is attachable to a receiver hitch. As seen for example in FIG. 2, FIG. 3 and FIG. 5, certain embodiments also include a mount 6 on a central support member 23. A bottom wall 11 and a front wall 10 are planar and meet at an angle, for example, perpendicular to one another as seen in FIG. 1. It will be appreciated that in certain embodiments, a bottom wall 11 and a front wall 10 meets at an angle besides 90°. It will also be appreciated by those skilled in the art that, certain embodiments of a frame and mounting structure include other structural characteristics to allow attachment to a plow and other features of an implement.

As seen in FIG. 1, FIG. 2, FIG. 5 and FIG. 6, a mounting structure 18 further includes a side wall 17 attaching to a bottom wall 11 and a front wall 10. In certain embodiments, as seen in FIG. 2 and FIG. 6, a plurality of braces 19 further support a bottom wall 11 and a front wall 10.

Still referring to FIG. 2 showing a top-down view of an embodiment of an implement, a plow 3 and a wheel 5 are in coalignment and as seen by line 22. A wheel 5 is attached to a frame back end 2b. In certain embodiments, the configuration of the plow, roller, and wheel allow the effective creation of the irrigation furrow. In certain embodiments, the effective width 51 (seen in FIG. 7B) of a wheel 5 is greater than the effective width 50 (seen in FIG. 8) of a plow 3. By having the effective width 51 of a wheel 5 be greater than that of a plow, the wheel is able to reinforce the furrow. However, it will be appreciated that other size variations may be used. In certain embodiments, a wheel effective width is approximately 15 cm (6 inches), while a plow effective width is approximately 11 cm (4⅜ inches), although it will be appreciated that other sizes may be used.

Certain embodiments of an implement include a roller 4 disposed to move relative to the plow (for example, move up and down). Referring to FIG. 5, the bottom 4a of a roller 4 may be in contact with the ground. Still referring to FIG. 5, in certain embodiments, a plow has a front end 3a and a back end 3b, with a plow body 3c extending therebetween. In certain embodiments, a plow back end 3b extends back past a roller leading edge 4b. Moreover, as seen in FIG. 5 and FIG. 6, certain embodiments of a plow 3 are configured to attach a replaceable cutting edge 28, allowing replacement of the cutting edge after wear.

In certain embodiments, as seen for example in FIG. 1, FIG. 3, FIG. 5, and FIG. 6, a frame 2 includes a horizontal member 14 attaching to a mounting structure 18. A horizontal member 14 extends from a frame front end 2a towards a frame back end 2b. A horizontal member 14 optionally attaches to a vertical member 13, as seen in FIG. 3. In certain embodiments, as seen in FIG. 5, a vertical member 13 is further attached to a plow 3. In certain embodiments, a cross bar supports a plurality of vertical members or horizontal members. Certain embodiments of a cross bar 15, as seen in FIG. 3, are joined with a vertical member 13.

Figure 4:
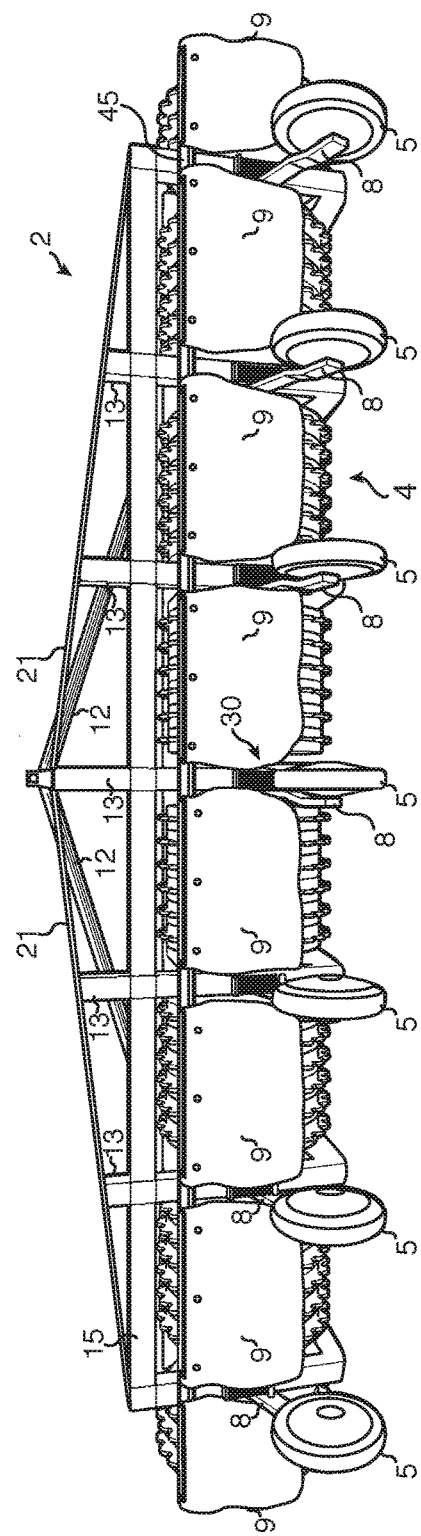
FIG. 4: A rear-perspective view of certain embodiments of the invention.

In certain embodiments, as seen in FIG. 6, a frame 2 further includes other support members to stabilize the frame. For example, certain embodiments include a first web 12 having a first end 12a attaching to a mounting structure 18 and a second end 12b attaching to a central support member 23. In certain embodiments, a frame 2 further includes a second web 24 having one end attaching to a first web 12. A second web 24 includes another end attaching to a mounting structure 18, and a second web 24 further attaches to a horizontal member 14. Referring to FIG. 5 and FIG. 6, in certain embodiments, a chord 29 is attached between a central support member 23 and a vertical member 13. Referring to FIG. 4, and FIG. 6, a diagonal member 21 further attaches to a top end of a vertical member 13. It will be appreciated that the frame described herein is merely exemplary, and other configurations in certain embodiments have other structural configurations that allow for the frame to generally support the plows, rollers, and wheel.

Figure 8:
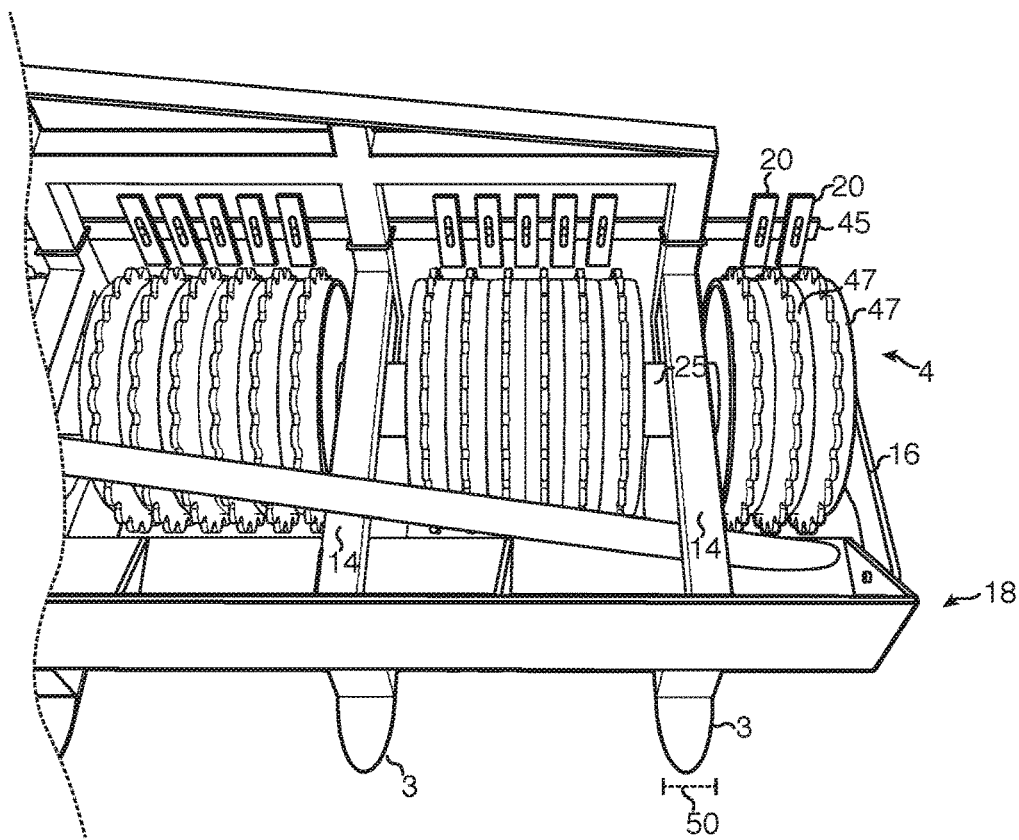
FIG. 8: A front perspective view of certain embodiments of the invention.

Referring to FIG. 2 and FIG. 3, in certain embodiments, a plow 3 coaligned with a wheel 5 is disposed between rollers 4, where such rollers may share a similar axis of rotation. In certain embodiments, a roller has an axis of rotation generally perpendicular to the direction of motion of an implement. A roller is generally adjacently located to a plow. A roller levels the ground after the plow 3 creates a furrow. A roller generally has a round outer wall, where a roller may include, but is not limited to, a cylindrical form, a barrel form, and a hyperboloid form. In certain embodiments, a roller 4 further includes a plurality of segments. It will be appreciated that the implement 1 may be constructed to various widths as to allow more than or less than the number of rollers shown herein. It will also be appreciated that the distance between two plows may be sized to fit any number of roller segments. Certain embodiments of a roller segment have a round form, with for example a smooth outer surface. In certain embodiments, as shown in FIG. 3 and FIG. 8, a roller segment 47 is a cultipacker further having peaks and troughs along the outer surface. It will also be appreciated that the outer surface of a roller may include other types of surface features including, but not limited to, annular ridges, helical ridges, and protrusions.

Figure 10:
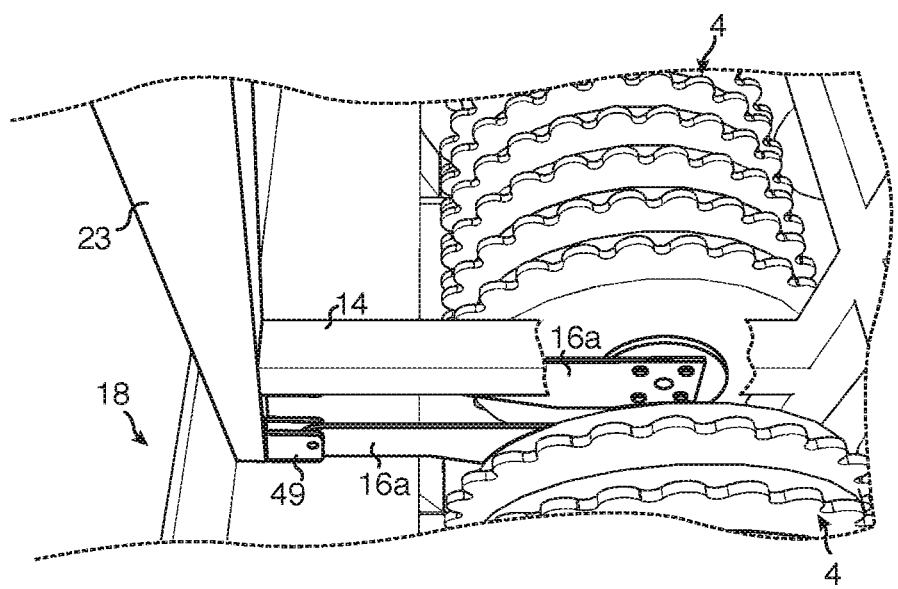
FIG. 10: A perspective view of certain embodiments of the invention.

The pivotable attachment of the roller arm to the implement allows the rollers 4 to level the ground while conforming to the ground as the implement 1 traverses uneven terrain. Referring to FIG. 1 and FIG. 6, in certain embodiments, a roller 4 rotates about an axis of rotation, for example, around an axle. A roller is further mounted to a roller arm 16 with fasteners 26. The roller arm 16 is further pivotably attached to an implement frame 2, for example, at a pivot 27 on a side wall 17. It will be appreciated that certain embodiments of the invention include a roller or rollers sharing an axis of rotation. In certain embodiments, more than one axle is provided, where each axle is able to move independently of one another in space via different sets of roller arms. In certain embodiments, a roller is connected to one another with a connection 25 (as seen in FIG. 8). In certain embodiments, as seen in FIG. 10, a second roller arm 16a is attached to the implement, for example, on a pivot housing 49. In certain embodiments, a pair of roller arms contains a roller or a set of roller, where the pair of roller arms is attached along the implement. In certain embodiments, as seen in FIG. 10, a roller arm 16a is located approximately near the central support member 23. However, it will be appreciated that in certain embodiments of the implement, an implement includes at least one roller axle having a roller, where the at least one roller axle is attached to a pair of roller arms. The roller arms may be attached anywhere along an implement, including, but not limited to, for example, along the mounting structure 18, or attached to a plow.

Referring to FIG. 4, in certain embodiments, a mud flap 9 is placed behind a roller 4. A mud flap 9 limits soil and debris from dispersing into a furrow created by a plow. In certain embodiments, as shown in FIG. 4 and FIG. 6, a mud flap 9 is attached to a horizontal bar 45 towards the back end of an implement. In certain embodiments, a mud flap 9 is secured to a mud flap holder 46 where a mud flap holder is further attached to the horizontal bar 45.

Figure 9:
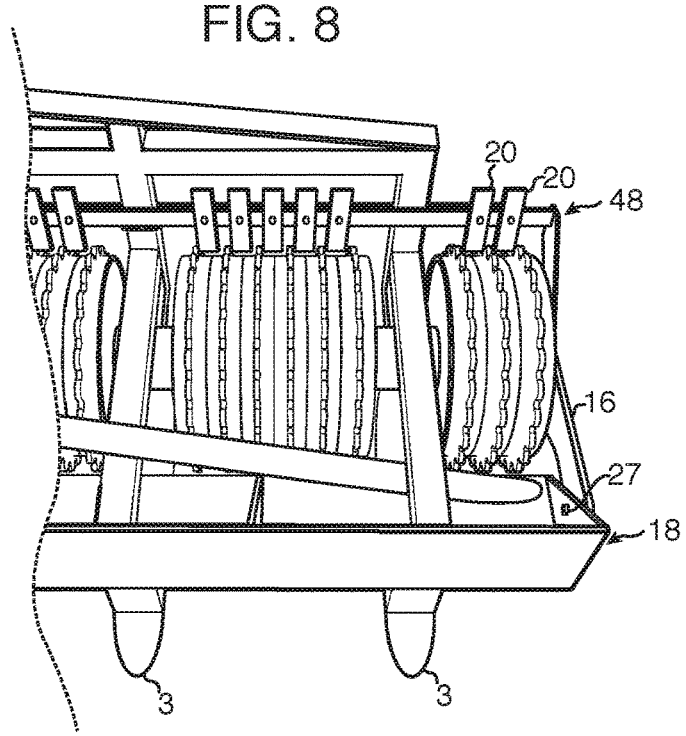
FIG. 9: A front perspective view of certain embodiments of the invention.

In certain embodiments, a scraper removes excess soil build up on a roller. In certain embodiments, as shown in FIG. 8, a scraper 20 is attached to a horizontal bar 45. A scraper 20 positioned between roller segments 47 of a roller 4 removes soil and debris from the roller. In certain embodiments, an implement includes a scraper 20 disposed to move simultaneously with a roller 4. As a roller 4 moves up and down relative to the pivot 27, a scraper 20 moves in concert with the roller. For example, referring to FIG. 9, a scraper 20 is located on a scraper frame 48, where a scraper frame 48 is attached to an aspect of a roller such as a roller arm 16.

Figures 7A, 7B:
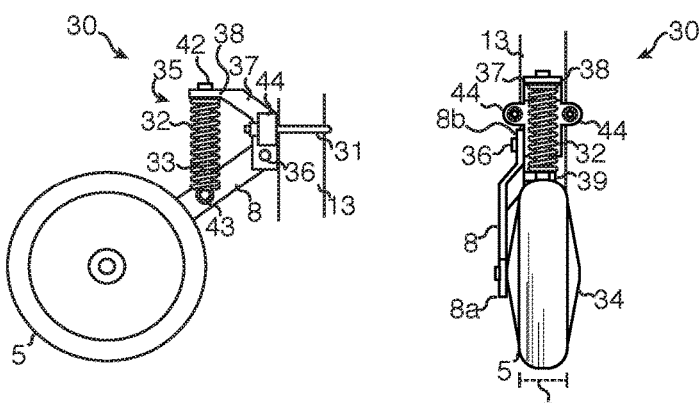
FIG. 7A: A side view of certain embodiments of a wheel.
FIG. 7B. A rear view of certain embodiments of a wheel.

Generally, a wheel is aligned with a plow. In certain embodiments, a wheel compacts the soil of a furrow created by the plow. Furthermore, a wheel levels the ground, making a furrow line even. A wheel 5 is generally actuated to deliver a downward force towards the ground. In certain embodiments, a wheel assembly includes a spring-actuated assembly, although it will be appreciated that other mechanical features are possible to provide the wheel a downward force. As seen for example in FIG. 2 and FIG. 4, a wheel assembly 30 is located at the frame back end 2b. Certain embodiments of a wheel assembly 30 are illustrated in FIG. 7A and FIG. 7B. A wheel arm 8 has a first end 8a that is rotatably attached to a wheel 5. A wheel arm 8 has a second end 8b that pivots around a first pivot 36 located on an upper arm 37. An upper arm 37 has an overhang 38, where a first end of a coil assembly 35 attaches to an upper mount 42. A wheel arm 8 has a second pivot 39 located between the wheel arm first end 8a and second end 8b, where the second pivot 39 attaches to a second end of a coil assembly 35. In certain embodiments, a coil assembly 35 includes a spring 32 and a stem 33. In certain embodiments, as shown in FIGS. 7A and 7B, the spring 32 is a helical compression spring. It can be appreciated that the stiffness of the spring may be adjusted, for example, by reducing the length of the stem 33 between the upper mount 42 and the lower mount 43.

In certain embodiments, the upper arm 37 has a mounting member, for example, a support mount 44. In certain embodiments, a U-bolt 31 fastens the support mount 44 of the wheel assembly to a vertical member 13. It will be appreciated that the height of the wheel assembly relative to the ground may be adjusted by securing the wheel assembly along the vertical member 13. In certain embodiments, a wheel 5 includes a wheel cover 34 to prevent soil or debris from seizing the wheel. It will also be appreciated that a wheel cover 34 aids to reinforce the sides of the furrow. It will be appreciated that a wheel is attached to an implement in other manners, or in other locations besides those as described herein. It will be appreciated that in certain embodiments, a wheel is provided with a downward force through other assemblies known to those skilled in the art.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The invention claimed is:

1. An apparatus for creating a furrow comprising:
   a frame;
   a plow, said plow comprising a front end and a back end and a body therebetween, said plow attached to said frame;
   a wheel assembly comprising a wheel, said wheel located behind and coaligned with said plow; and
   a roller comprising a round form, said roller rotatably mounted on an arm, said arm pivotably attached to said frame, wherein said roller is disposed to move relative to said plow,
   wherein said plow is adjacently located to at least one roller.

2. The apparatus in claim 1, wherein said wheel further comprises a wheel cover.

3. The apparatus in claim 1, wherein an effective width of said wheel is greater than an effective width of said plow.

4. The apparatus in claim 1, wherein said frame further comprises:
   a mounting structure, said mounting structure comprising:
   a front wall, said front wall having a mount configured to attach to a receiver hitch; and a bottom wall, said bottom wall attached to said plow.

5. The apparatus in claim 4, wherein said frame further comprises:
   a vertical member, said vertical member attaches to said plow, wherein said wheel assembly attaches to said vertical member; and
   a horizontal member, said horizontal member attaches to said mounting structure and said vertical member.

6. The apparatus in claim 1, wherein said plow back end extends past a leading edge of said roller.

7. The apparatus in claim 1, wherein said wheel assembly comprises a spring-actuated assembly.

8. An apparatus for creating a furrow comprising:
a frame, said frame comprising a front end and a back end;
a plurality of plows comprising a plow front end and a plow back end, the plurality of plows attached to said frame front end;
a plurality of wheel assemblies comprising a wheel, the plurality of wheel assemblies attached to said frame back end; and
a plurality of rollers comprising a round form,
wherein said plurality of plows are coaligned with said plurality of wheels; and
wherein said plurality of plows are coaligned are disposed between said plurality of rollers.

9. The apparatus in claim 8, wherein said plurality of rollers is rotatably mounted on an arm, and said arm is pivotally attached to said frame.

10. The apparatus in claim 8, said frame further comprising:
a mounting structure, said mounting structure comprising a front wall, said front wall having a mount configured to attach to a receiver hitch; and a bottom wall, said bottom wall attached to said plow.

11. The apparatus in claim 8, wherein said wheel assembly comprises a spring-actuated assembly providing said wheel a downward force.

12. An apparatus for creating a furrow comprising:
a plow, said plow comprising a front end and a back end and a body therebetween;
a vertical member, said vertical member attached to said plow;
a wheel assembly, said wheel assembly further comprising a wheel, said wheel located behind said plow back end and coaligned with said plow; and a support mount, said support mount configured to attach to said vertical member; and
a plurality of rollers, each of said plurality of rollers comprising a round form and rotatable about an axis of rotation, said axis of rotation disposed between said plow front end and said wheel
wherein said plow is disposed between said plurality of rollers.

13. The apparatus in claim 12, further comprising:
a mounting structure attached to said plow; and
a horizontal member connected to said vertical member and said mounting structure.

14. The apparatus in claim 13, wherein said roller is pivotably attached to said mounting structure.

* * * * *